United States Patent [19]

Johnson

[11] Patent Number: 4,594,090

[45] Date of Patent: Jun. 10, 1986

[54] HIGH NUTRIENT CONTENT FERTILIZERS

[76] Inventor: Wallace Johnson, Geraldine, Mont. 59446

[21] Appl. No.: 786,996

[22] Filed: Oct. 15, 1985

[51] Int. Cl.$^4$ .................. C05B 15/00; C05C 9/00
[52] U.S. Cl. ................................ 71/29; 71/36; 71/40
[58] Field of Search ................. 71/29, 34, 36, 40

[56] References Cited

U.S. PATENT DOCUMENTS

| | | | |
|---|---|---|---|
| 2,814,556 | 11/1957 | Christoffel | 71/29 |
| 3,022,153 | 2/1962 | Miller | 71/29 |
| 3,326,666 | 6/1967 | Walters, Jr. | 71/29 |
| 3,554,730 | 1/1971 | Slater et al. | 71/34 |
| 3,713,802 | 1/1973 | Gittenait | 71/29 |
| 3,723,086 | 3/1973 | Poyner et al. | 71/29 |
| 3,918,952 | 11/1975 | Neumiller | 71/28 |
| 3,928,015 | 12/1975 | Siegel et al. | 71/28 |
| 4,116,664 | 9/1978 | Jones | 71/29 |
| 4,134,750 | 1/1979 | Norton et al. | 71/29 |
| 4,310,343 | 1/1982 | Verdegaal et al. | 71/28 |
| 4,315,763 | 2/1982 | Stoller et al. | 71/29 |
| 4,388,101 | 6/1983 | Lowder | 71/29 |
| 4,397,675 | 8/1983 | Young | 71/28 |
| 4,402,852 | 8/1983 | Young | 252/182 |
| 4,404,116 | 8/1983 | Young | 252/182 |
| 4,409,015 | 10/1983 | Grace, Jr. | 71/28 |
| 4,445,925 | 5/1984 | Young | 71/28 |
| 4,447,253 | 5/1984 | Young | 71/28 |
| 4,456,463 | 6/1984 | Stoller | 71/29 |

*Primary Examiner*—Ferris H. Lander
*Attorney, Agent, or Firm*—Pollock, Vande Sande & Priddy

[57] ABSTRACT

A method of making fertilizer comprising the steps of mixing an aqueous solution of sulfuric acid with diammonium phosphate in a weight ratio of diammonium phosphate to sulfuric acid from about 3 to about 5, and mixing the resulting reaction products with urea in a weight ratio of urea to sulfuric acid from about 7 to about 10. The resulting fertilizer has low corrosion properties and has a salt-out temperature below about 0° F.

16 Claims, No Drawings

HIGH NUTRIENT CONTENT FERTILIZERS

FIELD OF THE INVENTION

This invention relates to liquid fertilizers having a high plant nutrient content, a low pH, and a low salting-out temperature, and to processes for making such fertilizers.

BACKGROUND OF THE INVENTION

Liquid fertilizers, in general, have some advantages over solid fertilizers in that they can be handled more easily and more readily applied in controlled amounts to soils. Liquid fertilizers are especially advantageous in areas which are irrigated because the fertilizer can readily be applied to the soil through the irrigation system. For economics in handling, storing, and transporting liquid fertilizers it is desirable for the fertilizer to have a high concentration of plant food components. However, highly concentrated liquid fertilizers have tended to salt-out at low temperatures, which causes problems in storage and in distributing the fertilizers. The problems of salt-out are accentuated by the difficulty of redissolving the solids which have formed.

Attempts to alleviate the problems caused by salt-out have been made in the prior art. For example, in U.S. Pat. No. 4,315,763 Stoller describes a high analysis fertilizer reported therein not to salt-out at 0° C. In U.S. Pat. No. 4,388,101 Lowder describes a liquid fertilizer made from sulfuric acid, urea, and ammonia which is stated to be crystal-free when stored for one month at 32° C. However, liquid fertilizers having salt-out temperatures significantly lower than 32° F. are desirable.

In many areas of the country which are irrigated the soils are alkaline, and the preferred fertilizers for these soils have a low pH in order to increase the acidity of the soil. Sulfuric acid is a conventional component used to achieve a desirable pH for the fertilizer. However, sulfuric acid is corrosive to materials such as mild steel used in storing and dispensing fertilizers and efforts have been made to inhibit the corrosive effect of fertilizers based on sulfuric acid. However, at least some of these efforts have required the use of additives which function as corrosion inhibitors. For example, in U.S. Pat. No. 4,402,852, Young discloses the use of a dialkyl-thiourea as a corrosion inhibitor for sulfuric acid-urea compositions in the presence of carbon steel, and in U.S. Pat. No. 4,404,116, Young discloses the use of a cupric ion-containing compound for reducing the corrosive effect of urea-sulfuric acid mixtures on stainless steel.

A further problem in the manufacture of fertilizers using sulfuric acid arises from the exothermic nature of its reaction with other components used to make the fertilizer. The exothermic reaction can result in unacceptably high temperatures during the process of making the fertilizer.

This problem has been attacked in several different ways in the prior art. For example, in U.S. Pat. No. 4,310,343, Verdegaal et al discloses the use of a heat sink to dissipate heat which builds up when making a liquid fertilizer having a high nitrogen and sulfur content, and in U.S. Pat. No. 4,445,915, Young discloses a method of removing heat generated by the reaction of urea and sulfuric acid by cooling the liquid phase by direct heat exchange with air.

The prior art discloses teachings which have been used to overcome problems arising (1) from the use of concentrated liquid fertilizers and (2) from the use of sulfuric acid in making the fertilizers; however, highly concentrated acidic fertilizers which have a very low salt-out temperature and which are substantially non-corrosive are desirable.

SUMMARY OF THE INVENTION

It is accordingly one object of this invention to provide an acidic liquid fertilizer having a high concentration of plant nutrients and having a low salt-out temperature.

It is another object of this invention to provide an acidic liquid fertilizer which combines a low pH and corrosion inhibition without special additives.

It is still another object of this invention to provide a method of making a low pH liquid fertilizer with sulfuric acid as one of the reagents wherein the temperature is maintained within acceptable limits by control of the concentrations and compositions of the reactants.

In accordance with this invention there has been provided a method of producing a stable acidic liquid fertilizer containing N, $P_2O_5$, and S in a concentration of at least about 28% and having a salt-out temperature below about 0° F. comprising the steps of (a) mixing an aqueous solution of sulfuric acid with diammonium phosphate, said aqueous solution containing sulfuric acid in a concentration from about 10 to about 16% by weight, said diammonium phosphate being present in an amount from about 3 grams to about 5 grams per gram of sulfuric acid; (b) mixing urea with the reaction products of sulfuric acid and diammonium phosphate, said urea being provided in an amount from about 7 grams to about 10 grams per gram of the sulfuric acid which had been mixed with the diammonium phosphate in the preceding step.

The fertilizer produced by this process has a high concentration of plant nutrients and yet does not salt-out until an extremely low temperature, i.e. 0° F. or even −20° F. is reached. In addition, for a low pH material the fertilizer unexpectedly has little or no corrosive action on materials such as mild steel or aluminum.

DETAILED DESCRIPTION OF THE INVENTION

In the first step of carrying out the invention, an aqueous solution of sulfuric acid in a concentration of from about 10% to about 16% is mixed with diammonium phosphate in a weight ratio of diammonium phosphate to sulfuric acid of from about 3 to about 5. In the preferred method of carrying out the invention the aqueous solution of sulfuric acid is mixed with the diammonium phosphate at a temperature of from about 100° F. to about 140° F. Temperatures below about 100° F. result in a substantial increase in the mixing time, and temperatures above about 140° F. may result in the formation of crystals in the mixture. In the preferred method of carrying out the invention, advantage is taken of the heat of hydration of sulfuric acid by adding sulfuric acid to water to form a hot aqueous solution of sulfuric acid. For instance, mixing about a 33% solution of sulfuric acid at about 70° F. with enough water at about 70° F. to produce a 14% solution of sulfuric acid will produce a mixture at 70° F. having a temperature of about 140° F.

The aqueous sulfuric acid solution which is mixed with the diammonium phosphate contains sulfuric acid in a concentration in the range of about 10% to about 16% by weight, preferably in a concentration from about 11% to about 14% by weight and most preferably about 12% to about 13% by weight.

The dialkylphosphate is preferably provided in a weight ratio of dialkylphosphate to sulfuric acid of about 3.5 to about 4.5 and most preferably in a weight ratio of about 4.

Although reference is made herein to diammonium phosphate, the composition of the phosphate compound may depart from that for the formula conventionally ascribed to the compound as $(NH_4)_2HPO_4)$ in which two ammonium ions per phosphate ion are shown and, for example, may suitably range down to about 1.8 ammonium ions per phosphate ion. In the preferred method of carrying out the invention, if less than two ammonium ions are present per phosphate ion, sufficient additional phosphate compound is added to bring the ammonium content to concentrations which would be achieved by the use of pure diammonium phosphate.

Mixing of the aqueous solution of sulfuric acid with the diammonium phosphate results in a temperature increase from about 20° F. to about 30° F. For example, sulfuric acid and diammonium phosphate, each having an initial temperature of about 100° F., will produce a mixture having a temperature after reaction of about 130° F.

In the next step of the process, urea is added to the mixture produced by mixing diammonium phosphate and sulfuric acid. This step is endothermic and the temperature of the solution will decrease by about 20° F. to about 30° F. It has unexpectedly been found that the mixture of sulfuric acid and diammonium phosphate produced in the preceding step has the ability to dissolve and/or react with relatively large amounts of urea to produce a solution which is stable against salt-out and which is unexpectedly non-corrosive. For example, it has been found that the resulting product can contain urea in a concentration of from about 7 to about 10 grams of urea per gram of sulfuric acid. Furthermore, the resulting solution, even though containing such a high concentration of urea, is stable at temperatures as low as 0° F. and even lower to −20° F. In the preferred method of carrying out the invention urea in a weight ratio of urea to sulfuric acid to about 7.5 to about 9 is provided. The optimum weight ratio is about 8.

The water content of the liquid fertilizer may be in the range of 32 to about 45% by weight, is preferably in the range of 35 to about 40% by weight. In the preferred method of carrying out this invention, the weight ratio of urea to diammonium phosphate is maintained within the range of about 1.5 to about 3, and most preferably from about 1.7 to about 2.3.

The concentration of nitrogen in the fertilizer is preferably in the range from about 18% to about 25%; the concentration of $P_2O_5$ is preferably present in the range from about 8% to about 13%; and, the concentration of S is preferably in the range from about 1% to about 2%, and most preferably from about 1.4% to about 1.7%. The pH preferably is in the range from about 1.5 to about 3, and most preferably from about 1.5 to about 2.75. The total concentration of N, $P_2O_5$ and S is preferably from 31% to about 36% and most preferably from about 31% to about 33%.

Having thus described the invention the following examples are offered to illustrate in more detail.

EXAMPLE I

Ninety grams of 33% sulfuric acid is mixed with 150 grams of water and 102 grams of dry diammonium phosphate analyzing 18-46-0 is added to the resulting mixture. The sulfuric acid reacts exothermically with the water and then with the diammonium phosphate and the temperature rises from about 70° F. to about 130° F.

258 grams of granulated urea analyzing 46-0-0 is added to the hot reaction products of the preceding step. The dissolution of the urea causes the temperature of the resulting invention to drop to about 100° F. and produces a liquid fertilizer analyzing 23-8-0-1.5, having a pH of 2.5 to 3.0, and a salt-out temperature of less than 0° F. The product is a clear green liquid.

The resulting product has low corrosive properties and can be used even with mild steel.

EXAMPLE II

Eighty-four grams of sulfuric acid having a concentration of 33% were mixed with 174 grams of water and dry diammonium phosphate in an amount of 132 grams was added to the resulting aqueous solution of sulfuric acid, bringing the temperature of the mixture to about 140° F. Two hundred and ten grams of urea were then added to the resulting mixture which reduced the temperature to about 100° F. The resulting product analyzed 20-10-0-1.5 had a pH of 1.5 to 2.75.

EXAMPLE III

A 600 gram sample of a liquid fertilizer made as set out in Example II was placed in a freezer maintained at −20° F. and a visual examination of the sample was made every hour. When the temperature of the liquid reached −5° F., a few crystals started to appear, and at −10° F., the crystals became more obvious. However, the crystals did not settle out. Even when the temperature of the liquid reached −20° F., there was no salt-out.

EXAMPLE IV

In order to test the corrosiveness of the instant fertilizer with that of another acidic, high analysis fertilizer, two pieces of aluminum having the same size and weighing 114 grams each were prepared. One was placed in 600 grams of a liquid fertilizer analyzing 20-10-0-1.5 which was made in accordance with Example II and having a pH of 1.75 while the other was placed in 600 grams of a 29-9-0-5 liquid fertilizer having a pH of about 0.5.

Each sample was left in the fertilizer at about room temperature for 21 days at the end of which visual examination of the samples showed existence of a residue on each sample. However, the sample which had been in the fertilizer of the present invention showed about 10% of the amount of residue as the sample which had been in the other fertilizer.

At the end of the 21 day period, both aluminum samples were removed from the fertilizer solutions, washed in plain tap water, dried and weighed. The sample which had been in the 20-10-0-1.5 fertilizer weighed 113.5 grams and the one which had been in the 29-0-0-5 solution weighed 112 grams.

I claim:

1. A method of producing a stable acidic liquid fertilizer containing N, $P_2O_5$ and S in a total concentration of at least about 28% and having a salt-out temperature below about 0° F. comprising:

A. mixing an aqueous solution of sulfuric acid with diammonium phosphate, said aqueous solution containing sulfuric acid in a concentration from about 10% to about 16% by weight, and said diammonium phosphate being present in amount from about 3 grams to about 5 grams per gram of sulfuric acid; and B. mixing urea with the reaction products of said aqueous solution of sulfuric acid and said diammonium phosphate, said urea being provided in amount from about 7 grams to about 10 grams per gram of sulfuric acid which had been mixed with diammonium phosphate in step A.

2. The method according to claim 1 wherein the aqueous solution contains sulfuric acid in a concentration from about 11% to about 14% by weight.

3. The method according to claim 1 wherein the aqueous solution contains sulfuric acid in a concentration from about 12% to about 13% by weight.

4. The method according to claim 1 wherein the aqueous solution of sulfuric acid is mixed with diammonium phosphate in a weight ratio of diammonium phosphate to sulfuric acid from about 3.5 to abut 4.5.

5. The method according to claim 1 wherein the aqueous solution of sulfuric acid is mixed with diammonium phosphate in a weight ratio of diammonium phosphate to sulfuric acid of about 4.

6. The method according to claim 1 wherein the reaction products of sulfuric acid and diammonium phosphate are mixed with urea in a weight ratio of urea to sulfuric acid from about 7.5 to about 9.

7. The method according to claim 1 wherein the reaction products of sulfuric acid and diammonium phosphate are mixed with urea in a weight ratio of urea to sulfuric acid of about 8.

8. The method according to claim 1 wherein the aqueous solution of sulfuric acid is at a temperature of from about 100° F. to about 140°.

9. The method according to claim 1 wherein the weight ratio of urea to diammonium phosphate is from about 5 to about 3.

10. The method according to claim 1 wherein the weight ratio of urea to diammonium phosphate is about 1.7 to about 2.3.

11. The method according to claim 1 wherein the aqueous solution of sulfuric acid contains sulfuric acid in a concentration from about 11% to about 14% by weight, the diammonium phosphate is provided in a weight ratio of diammonium phosphate to sulfuric acid from about 3.5 to about 4.5, and the product of the reaction is mixed with urea in a weight ratio of urea to sulfuric acid from about 7.5 to about 9.

12. The method according to claim 1 wherein the aqueous solution of sulfuric acid contains sulfuric acid in a concentration from about 12% to about 13% by weight, the diammonium phosphate is provided in a weight ratio of diammonium phosphate to sulfuric acid of about 4, and the product of the reaction is mixed with urea in a weight ratio of urea to sulfate of about 8.

13. A liquid fertilizer made in accordance with claim 1 having a total concentration of N, $P_2O_5$ and S from about 31% to about 36%.

14. A liquid fertilizer made in accordance with claim 1 having a total concentration of N, $P_2O_5$ and S of from 31% to about 33%.

15. A liquid fertilizer made in accordance with claim 1 which analyzes about 18% to about 25% nitrogen, about 8% to about 13% $P_2O_5$ and about 1.4 to about 1.7% sulfur, has a salt-out temperature below about 0° F. and has a pH from about 1.5 to about 3.0.

16. A liquid fertilizer made in accordance with claim 1, which has a salt-out temperature below about 20° F. and a pH of about 1.5 to about 2.75, and contains N, $P_2O_5$ and S in a total concentration from about 31% to about 33% by weight.

* * * * *

UNITED STATES PATENT AND TRADEMARK OFFICE
CERTIFICATE OF CORRECTION

PATENT NO. : 4,594,090
DATED : June 10, 1986
INVENTOR(S) : Wallace Johnson

It is certified that error appears in the above—identified patent and that said Letters Patent is hereby corrected as shown below:

In column 1, line 32, delete "32°C" in favor of --32°F--.

Signed and Sealed this

Sixteenth Day of September 1986

[SEAL]

Attest:

DONALD J. QUIGG

Attesting Officer

Commissioner of Patents and Trademarks